Figure 1:
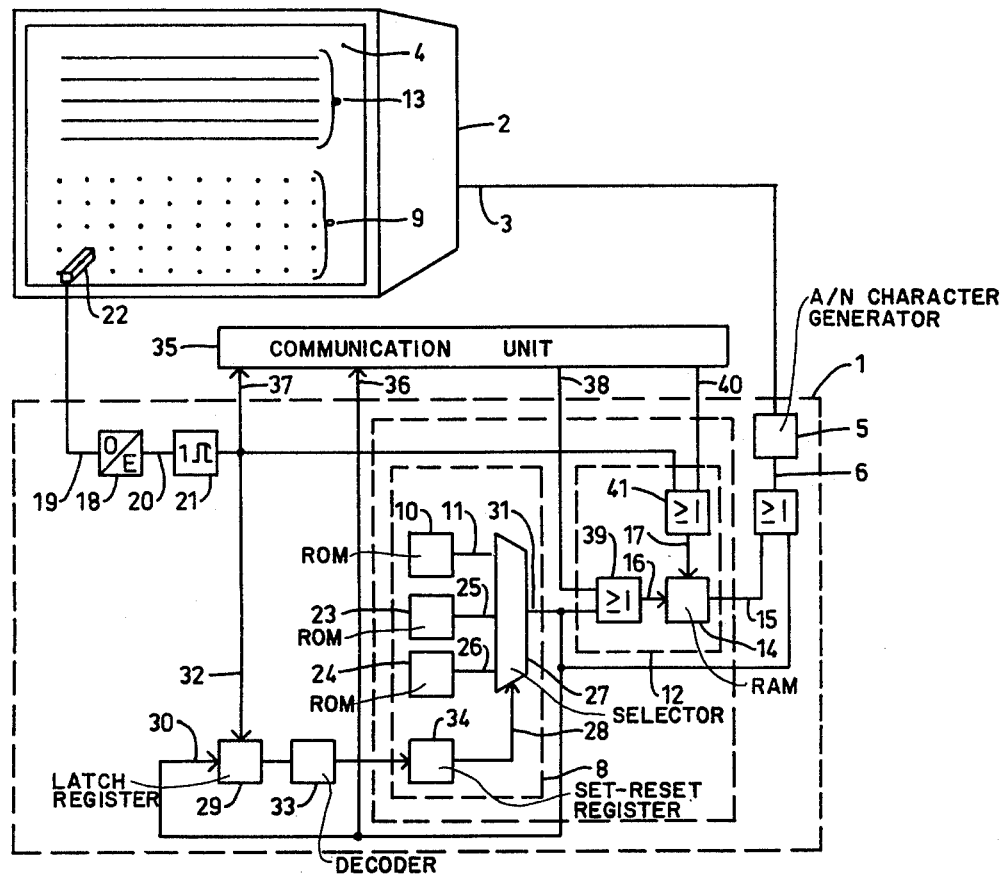

United States Patent [19]

Bejting et al.

[11] 4,190,833
[45] Feb. 26, 1980

[54] ALPHANUMERIC TERMINAL HAVING AN OPTOELECTRIC CONVERTER AND AN ASSOCIATED MONO-PULSE GENERATING CIRCUIT

[76] Inventors: Anders M. T. Bejting, 39 Vilans Väg, Danderyd, Sweden, S-182 35; Lars Å. Wern, 65 Upplandsgatan, Stockholm, Sweden, S-113 28

[21] Appl. No.: 875,658

[22] Filed: Feb. 6, 1978

[30] Foreign Application Priority Data

Feb. 18, 1977 [SE] Sweden .................. 7701861

[51] Int. Cl.² ............................................. G06F 3/14
[52] U.S. Cl. .................................. 340/707; 340/712;
340/748; 340/721
[58] Field of Search ....... 340/365 D, 324 A, 324 AD,
340/707, 711, 712, 721, 748, 749; 178/18-20

[56] References Cited

U.S. PATENT DOCUMENTS

| 3,543,240 | 11/1970 | Miller et al. | 340/324 A |
| 3,579,225 | 5/1971 | Clark | 340/324 AD |
| 3,624,633 | 11/1971 | Hofstein | 340/324 AD |
| 3,707,715 | 12/1972 | Perotto | 340/365 P |
| 3,877,018 | 4/1975 | Hakozaki | 178/18 |

OTHER PUBLICATIONS

*Some Applications of Digital Techniques in TV Receivers;* Doyle et al.; Broadcast & Television Receivers; vol. BTR-18 #4; Nov. 1972, p. 245.
*TV Set Terminal;* Papp et al.; IBM Tech. Discl. Bull., vol. 13 #5; Oct. 1970; p. 1385.
*Design of Man-Computer Dialogues;* Martin; IBM Systems Research Inst.; Prentice-Hall, Inc., pp. 161-174.

*Primary Examiner*—Marshall M. Curtis
*Attorney, Agent, or Firm*—Pollock, Vande Sande and Priddy

[57] ABSTRACT

The invention relates to an alphanumeric terminal comprising a text generator and a display unit with a signal input connected to the text generator and a cathode-ray tube screen arranged to display a plurality of lines with an alphanumeric information generated by an intensity modulation of a line raster on the cathode-ray tube screen in correspondence to a digitally coded information stored in the text generator, the text generator comprising an alphanumeric character generator with a data input and a text memory arranged to store the digitally coded information for generating said lines with alphanumeric information and connected to the data input of the character generator.

1 Claim, 3 Drawing Figures

ALPHANUMERIC TERMINAL HAVING AN OPTOELECTRIC CONVERTER AND AN ASSOCIATED MONO-PULSE GENERATING CIRCUIT

The invention relates to an alphanumeric terminal comprising a text generator and a display unit with a signal input connected to the text generator and a cathode-ray tube screen arranged to display a plurality of lines with an alphanumeric information generated by an intensity modulation of a line raster on the cathode-ray tube screen in correspondence to a digitally coded information stored in the text generator, the text generator comprising an alphanumeric character generator with a data input and a text memory arranged to store the digitally coded information for generating said lines with alphanumeric information and connected to the data input of the character generator.

An alphanumeric terminal of the type defined above can be complemented with an alphanumeric keyboard for enabling a conversation between an individual and a computer, for example as described in the U.S. Pat. No. 3,641,555. If the computer is a micro-computer that comprises the above-mentioned text generator and the display unit is a TV-set, then the completion with the alphanumeric keyboard can imply a considerable additional cost. However, the alphanumeric keyboard is necessary if the market for selling micro-computerbased equipment to common people is not to be limited to non-verbal games such as ball games and shooting games but come to include intellectual amusement games of different types, computerbased educational programs for every conceivable field of interest, stored program control of mains-connected devices, etc.

A possible solution to the problem with the cost of the alphanumeric keyboard is described in Electronics Design 25, Dec. 6, pp. 30–31 and consists in starting out from a mass-produced keyboard for an electronic calculator, dividing an alphanumeric character set into a number of sub-sets and, by means of a number of shift keys, switching over the keyboard between the different sub-sets of the character set. In Electronics Design 22 Oct. 25, 1976, pp. 122-133, further examples are given on another possible solution on the cost problem, the idea being to start out from the conventional alphanumeric keyboard and try to make a low-cost design. However, both these solutions seem to imply that a keyboard designer will confront a large number of compromise alternatives between which the choice is difficult. Consequently, a variety of designs from different manufacturers may occur, their sales being hindered by the lack of unitariness.

A first object of the invention is to provide a unitary solution to the problem with the design of the keyboard for a micro-computerbased equipment. A second object of the invention is to facilitate a shift between a plurality of character sets, and a third object is to make it possible for an alphanumeric terminal of the type defined in the preamble to be complemented with an alphanumeric keyboard at a small additional cost. Further objects of the invention will appear from the description below.

Figure 2:
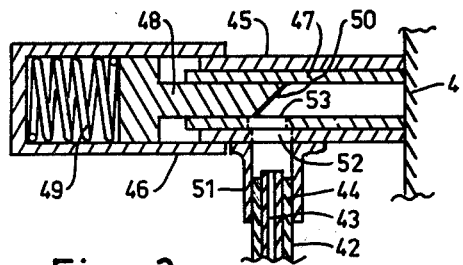
Figure 3:
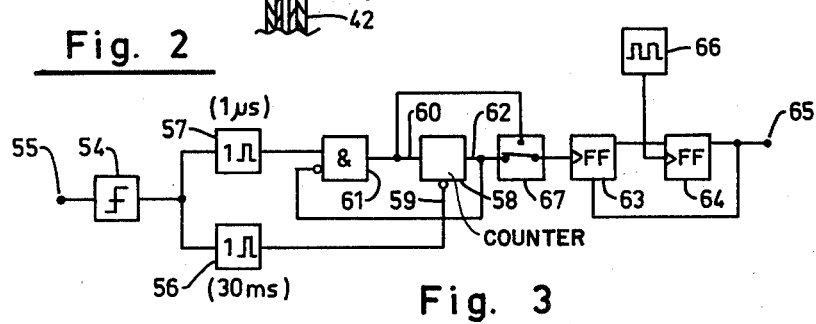

The invention the characteristics of which appear from the appended claims will now be described more in detail with reference made to the accompanying drawing where FIG. 1 is a lock diagram of a preferred embodiment of an alphanumeric terminal according to the invention and FIGS. 2 and 3 are a sectional view of an optomechanic device and a logic diagram of an electrical functional block, respectively in FIG. 1.

FIG. 1 shows an alphanumeric terminal comprising a text generator 1 and a display unit 2 with a signal input 3 connected to the text generator 1 and a cathode-ray tube screen 4 arranged to display a plurality of lines with an alphanumeric information generated by an intensity modulation of a line raster on the cathode-ray tube screen 4 in correspondence to a digitally coded information stored in the text generator 1, the text generator 1 comprising an alphanumeric character generator 5 with a data input 6 and a text memory 7 arranged to store the digitally coded information for generating said lines with alphanumeric information and connected to the data input 6 of the character generator 5.

According to the invention, the text memory 7 of the text generator 1 is divided into partly a first portion 8 that is arranged for a presentation of a first group of lines 9 of said plurality of lines on a lower portion of the cathode-ray tube screen 4 and comprises at least one read-only memory 10 that has a memory content arranged to produce a reproduction of an alphanumeric character set on the first group of lines 9 and is provided with a read output 11 connected to the data input 6 of the character generator 5, partly a second portion 12 that is arranged for a presentation of a second group of lines 13 of said plurality of lines on an upper portion of the cathode-ray tube screen 4 and comprises a random-access memory 14 arranged for a reproduction of an alphanumeric text on the second group of lines 13 and provided with a read output 15 connected to the data input 6 of the character generator 5, a write input 16 connected to the read output 11 of the read-only memory 10 and an enable input 17 arranged to provide a writing operation via the write input 16.

The text generator 1 is further arranged to comprise an optoelectric converter 18 with an optical input 19 and an electrical output 20, the latter being connected to the enable input 17 of the random-access memory 14 via a mono-pulse generating circuit 21, and a light transferring means 22 that is connected to the optical input 19 of the optoelectric converter 18 and is arranged to be movable over the cathode-ray tube screen 4 in order to be placed upon selected characters in the character set reproduced on the first group of lines 9. When the light transferring means 22 is placed upon a selected character in the character set, the optoelectric converter 18 will be supplied with light pulses representative of the selected character and, in time coincidence with these light pulses, a digital code word that corresponds to this character will appear on the read output 11 of the read-only memory 10. The connection of the output 20 of the optoelectric converter 18 to the enable input 17 of the random-access memory 14 via the mono-pulse generating circuit 21 makes it possible for the digital code word that corresponds to the selected character to be written into the random-access memory 14. In order to reproduce an alphanumetic text, the random-access memory 14 is provided with suitable control means such as described for example in the U.S. Pat. No. 3,641,555.

According to the example, the first portion 8 of the text memory 7 in the text generator 1 comprises two further read-only memories 23 and 24 that are provided with respective read outputs 25 and 26 connected to the data input 6 of the character generator 5, a selector means 27 being interconnected between the read outputs of the three read-only memories and the data input 6 of the character generator 5 and having a control input 28 arranged to switch the selector 27 between the three read-only memories in dependence on a selection between three alternative shift characters in said character set reproduced by the read-only memory 10. The switching of the selector 27 is provided by means of a cascade connection of a latch register 29 with a write input 30 connected to an output 31 of the selector 27 and an enable input 32 for providing a writing operation connected to the output 20 of the optoelectric converter 18 via the monopulse generating circuit 21, a decoder 33 for such digital code words registered in the latch register 29 that correspond to said shift characters, and a set-reset register 34 with an output connected to the control input 28 of the selector 27.

The memory content in each of the three read-only memories 10, 23 and 24 comprises preferably digital code words for all the three shift characters, the read-only memory 10 being arranged for the reproduction of said first character set, the read-only memory 23 being arranged for a reproduction of a second character set constituting a complement to said first character set, and the read-only memory 24 being according to the example arranged for reproduction of a word list preferably given a unitary word format. The word list can for example relate to a number of alternative measures, the purpose of the presentation of these being to reduce the time for initiating either of the measures by means of the light transferring means 22. The latter, which in a preferred embodiment of the invention has a window width substantially equal to the width that an individual character in the above-mentioned two character sets has at its disposal, can in a particular embodiment of the invention for the use in connection with the word list reproduced by the read-only memory 24 be given a window width equal to the width of said word format, the mono-pulse generating circuit 21 being arranged to supply a mono-pulse for each one of the characters in that word upon which the light transferring means 22 is being placed as it will later on be described more in detail.

In FIG. 1 the text generator 1 is connected to a comunication unit 35 that has a write input 36 connected to the output 31 of the selector 27, an enable input 37 for providing a writing operation connected to the output 19 of the optoelectric converter 18 via the mono-pulse generating circuit 21, a read output 38 connected jointly with the output 31 of the selector 27 to the write input 16 of the random-access memory 14 via a first OR-circuit 39, and an enabling pulse output 40 for providing a read-out operation connected jointly with the mono-pulse generating circuit 21 to the enable input 17 of the random-access memory 14 via a second OR-circuit 41. The communication unit 35 can comprise a micro-computer or be connected to an external computer. A further possibility is that the communication unit 35 is, via a telecommunication channel, connected to a corresponding communication unit in a second alphanumeric terminal.

FIG. 2 shows a sectional view of a preferred embodiment of the light transferring means 22 connected to the optoelectric converter 18 via a light conductor cable 42 consisting of an optical fibre bundle 43 with a surrounding protection cover 44 and provided with a pressure-operated optical gate means. For this purpose the light transferring means 22 comprises according to the example a rectangular front tube 45 and a rectangular back tube 46, the latter having an end to which the front tube 45 is fixed and an opposite closed end, and a pressure bar 47 in the form of a rectangular third tube which has a window width and a window height equal to the whole width and half the height at the disposal of an individual character in the character set on the cathode-ray tube screen 4 and has a slide bearing inside the front tube 45. That end of the pressure bar 47 that is facing the closed end of the back tube 46 is provided with a bolt shaped elements 48 having a head end which abuts against a helical spring 49 prestressed against the end wall of the back tube 46, and an opposite end which is bevelled at an angle of 45° and provided with a mirror layer 50. A further tube 51 is fixed at an angle of 90° relatively to the front tube 45 and is arranged for fastening of the light conductor cable 42. Openings 52 and 53 are made in the front tube 45 and in the pressure bar 47 for enabling that light received by the window at the free end of the pressure bar 47 can, when the latter is entirely entered into the front tube 45 as a consequence of the light transferring means 22 being pressed towards the cathode-ray tube screen 4 in FIG. 1, be transferred to the optical fibre bundle 43 via a reflection against the mirror layer 50 of the bolt shaped element 48. When the light transferring means 22 is removed from the cathode-ray tube screen 4, the pressure bar 47 will assume a rest position in which the helical spring 49 causes it to partly protrude from the front tube 45, and light received by the window at the free end of the pressure bar 47 is obstructed from passing through to the optical fibre bundle 43 since the mirror layer 50 has moved ahead of the opening 52 in the front tube 45 and no longer reflects the light towards the optical fibre bundle 43.

The light transferring means 22 can, in a particular embodiment of the invention for the use in connection with the above-mentioned word list reproduced by the read-only memory 24, be given a window width in the pressure bar 47 equal to the width of the word format of the word list as has been mentioned above, the height of the window in the pressure bar 47, however, still being equal to half the height at the disposal of an individual character. In this case, the optical fibre bundle 43 is given a corresponding lateral extension.

FIG. 3 shows a logical diagram of the mono-pulse generating circuit 21 in FIG. 1. A threshold circuit 54 has an input 55 connected to the output 20 of the optoelectric converter 18 in FIG. 1 and an output arranged to trigger a first retriggerable mono-pulse flipflop 56 with a pulsed duration of 30 milliseconds and a second retriggerable mono-pulse flipflop 57 with a pulse duration of 1 microsecond. A counter 58 has an inverting reset input 59 connected to an output of the first mono-pulse flipflop 56 and a forward stepping input 60 connected to an output of the second mono-pulse flipflop 57, the second connection being obtained via an AND-circuit 61 with an inhibiting input connected to an output 62 of the counter 58.

The counter 58 is arranged to count a number of mono-pulses from the mono-pulse flipflop 57 equal to the number of characters in said word format of the word list reproduced by the read-only memory 24 before the output 62 of the counter 58 is activated and a further forward stepping is inhibited. The above-mentioned pulse duration of 30 milliseconds for the mono-pulse flipflop 56 is selected slightly longer than the repetition period of the line raster on the cathode-ray tube screen 4 whereby, as long as the light transferring means 22 is pressed against screen 4, the mono-pulse flipflop 56 will be retriggered during its pulse duration and the counter 58 will maintain its output 62 activated after that its forward stepping has been inhibited. Correspondingly, the above-mentioned pulse duration of 1 microsecond for the mono-pulse flipflop 57 is selected slightly longer than the sweep time of the line raster for the width at the disposal of an individual character in order to ensure that the mono-pulse flip flop 57 is retriggered by laterally separated parts of one and the same character during its pulse duration so that each character causes only one mono-pulse.

In the case that the light transferring means 22 is provided with a window width equal to that width that an individual character has at its disposal on the cathode-ray tube screen 4, the output 62 of the counter 58 is connected to a trigger input of a bistable flipflop 63 that has an output connected to a data input of a D- flipflop 64. Flipflop 64 has an output 65 connected to a reset input of the bistable flipflop 63 and a clock pulse input connected to a clock pulse circuit 66 so as to supply on the output 65 a short activation pulse each time that the output 62 of the counter 58 is activated. The counter 58 is utilized for integrating a number of successive raster scans before the activation pulse is supplied on the output 65.

On the other hand, if the light transferring means 22 is provided with a window width equal to the width of the word format in the word list reproduced by the read-only memory 24, then the individual characters in the word format are mutually separated by two empty character positions and the trigger input of the bistable flipflop 63 is supplied with the mono-pulses that the AND- circuit 61 passes from the mono-pulse flipflop 57, the connection between the trigger input of the bistable flipflop 63 and the output 62 of the counter 58 being eliminated. The output 65 of the D-flipflop 64 will in this embodiment supply a short activation pulse for each mono-pulse passed by the AND-circuit 61, i.e. an activation pulse for each one of the characters in that word upon which the light transferring means 22 is placed. The mode of operation of the mono-pulse generating circuit 21 that is obtained is determined by means of a switch 67.

According to the invention, alphanumeric terminals of the type defined in the preamble can be complemented with a keyboard displayed on the cathode-ray tube screen 4 in FIG. 1 at a small additional cost and a unitary solution is provided to the problem with the design of the keyboard. A further essential advantage of the invention resides in the fact that complete safety can be obtained against a leakage of electrical current to an individual who operates the keyboard due to the fact that the light transferring means 22 requires only an optical connection to the text generator 1 via the light conductor cable 42 wherein the optical fibre bundle 43 suitably is constituted by glass and the surrounding protection cover 44 is constituted by plastic, both of which materials are electrically insulating. In the case that the alphanumeric terminal of the invention is built into a TV-set, the light transferring means 22 can without any risk whatsoever of leakage of electric current be put into the hands of, for example, a child, while a conventional stand-alone keyboard connected to the TV-set via an electrical cable would give incomplete safety against an electrical leakage.

We claim:

1. An alphanumeric terminal, comprising a text generator and a display unit with a signal input connected to the text generator and a cathode-ray tube screen arranged to display a plurality of lines with an alphanumeric information generated by an intensity modulation of a line raster on the cathode-ray tube screen in correspondence to a digitally coded information stored in the text generator, the text generator comprising an alphanumeric character generator with a data input and a test memory arranged to store the digitally coded information for generating said lines with alphanumeric information and connected to the data input of the character generator, the text memory in the text generator being divided into (a) a read memory that has a memory content arranged to produce a reproduction of an alphanumeric character set on a first portion of the cathode-ray tube screen and having a read output connected to the data input of the character generator and (b) a write-and-read memory that is arranged for a reproduction of an alphanumeric text on a second portion of the cathode-ray tube screen and having a read output connected to the data input of the character generator, a write input connected to the read output of the read memory and an enable input arranged to provide a writing operation via the write input, and the text generator further comprising an optoelectric converter with an optical input and an electrical output and a light transferring means that is connected to the optical input of the optoelectric converter and is arranged to be movable over the cathode-ray tube screen in order to be placed upon selected characters in the character set reproduced on said first portion of the cathode-ray tube screen, characterized by a mono-pulse generating circuit that comprises a retriggerable mono-pulse means having a pulse duration longer than the repetition period of the line raster on the cathode-ray tube screen and arranged to connect the electrical output of the optoelectric converter to the enable input of the write-and-read memory.

* * * * *